No. 790,052. PATENTED MAY 16, 1905.
E. B. HARDIE & D. F. DALTON.
COFFEE POT.
APPLICATION FILED MAY 16, 1904.
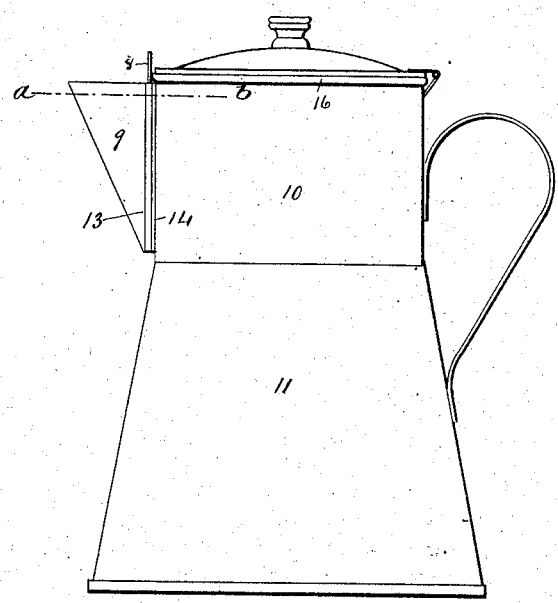
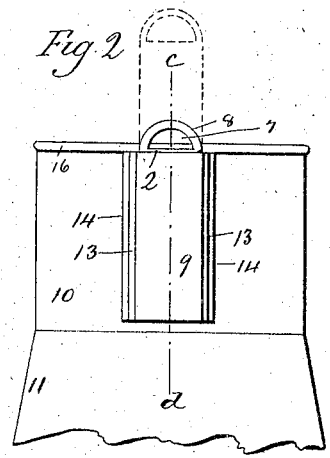
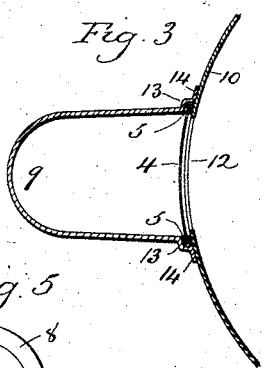
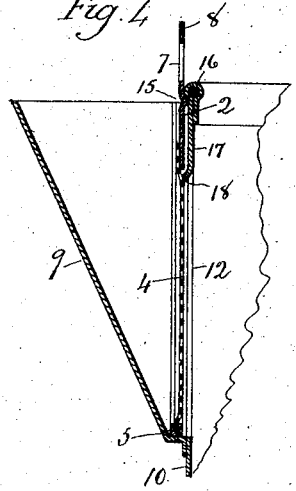
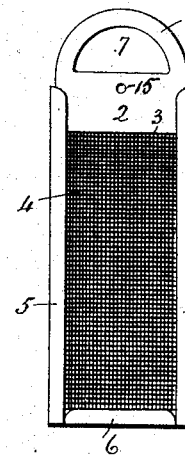
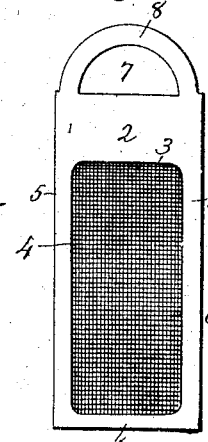
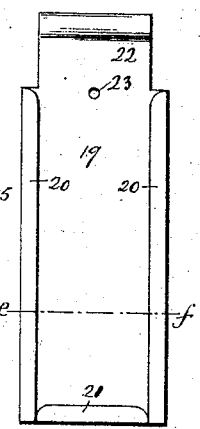

No. 790,052.                                         Patented May 16, 1905.

UNITED STATES PATENT OFFICE.

EDWARD B. HARDIE AND DANIEL F. DALTON, OF WATERBURY, CONNECTICUT.

COFFEE-POT.

SPECIFICATION forming part of Letters Patent No. 790,052, dated May 16, 1905.

Application filed May 16, 1904. Serial No. 208,081.

*To all whom it may concern:*

Be it known that we, EDWARD B. HARDIE and DANIEL F. DALTON, of Waterbury, in the county of New Haven and State of Connecticut, have invented a new and useful Improvement in Coffee-Pots; and we do hereby declare the following, when taken in connection with the accompanying drawings and the numerals of reference marked thereon, to be a full, clear, and exact description of the same, and which said drawings constitute part of this specification, and represent, in—

Figure 1, a view in side elevation of one form which a coffee-pot constructed in accordance with our invention may assume; Fig. 2, a broken view thereof, in front elevation, showing our removable strainer in its closed position by full lines and in an elevated position by broken lines; Fig. 3, a view in horizontal section on the line $a\,b$ of Fig. 1, than which it is drawn to a larger scale; Fig. 4, a broken view thereof, in vertical section, on the line $c\,d$ of Fig. 2; Fig. 5, a detached view, in front elevation, of our removable strainer; Fig. 6, a reverse view thereof; Fig. 7, a detached view, in front elevation, of our removable aroma-gate; Fig. 8, a view thereof in transverse section on the line $e\,f$ of Fig. 7.

Our invention relates to an improvement in coffee-pots, the object being to provide a coffee-pot at a small additional cost with an interchangeable strainer and aroma-gate, each of simple, convenient, and effective character.

With these ends in view our invention consists in certain details of construction and combinations of parts, as will be hereinafter described, and pointed out in the claims.

In carrying out our invention as herein shown we employ a strainer consisting of a frame 2 and a piece of wire-cloth 4. The said frame is made from a sheet-metal plate having parallel side edges and a large vertically-arranged oblong opening 3, over which the wire-cloth 4 is placed. The parallel side edges of the said plate and the lower edge thereof are bent over upon it to form parallel guiding-flanges 5 5 and a bottom flange 6, all gripping the wire-cloth 4. As shown, the frame 2 is rounded at its upper end and there formed with an opening 7, which results in the production of a bail-like handle 8. Preferably the frame 2 will be slightly bowed in cross-section. If desired, the wire-cloth 4 might be replaced by a piece of sheet metal having fine perforations; but however the strainer is made as to its details it must have parallel side edges. This strainer is inserted into a spout 9, having parallel sides and applied to a coffee-pot the body of which, as shown, comprises a cylindrical upper portion 10 and a flaring lower portion 11, the strainer being located entirely within the spout and outside of the body of the pot. The coffee-pot opens into the said spout through a large discharge-opening 12, formed in the cylindrical upper portion 10 of the pot, the metal of the body of the pot being wholly cut away to form the said opening instead of being perforated, as in the ordinary coffee-pot. For guiding and holding the strainer the inner edges of the parallel sides of the said spout 9 are struck up outwardly to form two parallel guideways 13 13, located between the body of the spout and the flanges 14 thereof, by which the spout is soldered or otherwise secured to the cylindrical upper portion 10 of the pot. These parallel guideways 13 13 respectively receive the parallel side edges formed by the guiding-flanges 5 5 of the strainer. On account of having parallel side edges it is apparent that the strainer will be supported and held in place from the moment its lower end is inserted into the upper ends of the parallel guideways of the spout and thereafter until the strainer has been pushed down into its closed position, at which time its flange 6 rests upon the bottom of the spout. It is equally plain that when the strainer is lifted it will still be guided and supported until just as its lower end leaves the upper ends of the said guideways. For the purpose of holding the strainer in its closed position we provide it upon its inner face with a locking projection 15, located just below its opening 7 and in position to snap under the bead-like edge 16 of the pot just as the strainer is going into its closed position. As shown, this projection 15 is formed by striking the metal of the frame 2 inward, as clearly shown in Fig. 4.

In case the wire-cloth 4 of the strainer should become clogged during the pouring of the coffee the inner face of the said cloth may be stripped of coffee-grounds by lifting it up in its guideways, when the rear face of the wire-cloth will be stripped of the grounds by means of a cross-piece forming a strainer-stripper 17 and constituting that part of the straight upper portion 10 of the body of the coffee-pot lying directly above the discharge-opening 12, the formation of which produces the said cross-piece forming the strainer-stripper 17. After the strainer has been stripped of grounds in the manner described it is again pushed down into its closed position without being removed from the coffee-pot. This stripping of the strainer may be done in a moment and permits the rapid pouring of the coffee to be continued without removing the strainer to wash it. The said strainer-stripper 17 may be made more effective by turning its edges inward to form a stripping-flange 18, as shown in Fig. 4.

For use in making the coffee we provide an aroma-gate 19, having parallel side edges made from a single piece of sheet metal and of the general form of the strainer, but made imperforate. This aroma-gate is slightly bowed in cross-section and has parallel guiding-flanges 20, a bottom flange 21, a handle 22, and a locking projection 23. When pushed into the parallel guideways 13 13, before described, and shoved down into its closed position, in which it is entirely located within the said spout and outside of the body of the spout, it completely closes the discharge-opening 12, and so retains in the pot the aroma of the coffee. After the coffee is made the aroma-gate is removed and replaced by the strainer. While it is desirable to use them interchangeably in this way, it is not essential and either may be used without the other.

It is apparent that in carrying out our invention some changes from the construction herein shown and described may be made. We would therefore have it understood that we do not limit ourselves thereto, but hold ourselves at liberty to make such departures therefrom as fairly fall within the spirit and scope of our invention.

Having fully described our invention, what we claim as new, and desire to secure by Letters Patent, is—

1. In a coffee-pot, the combination with a body having a flaring lower portion and a cylindrical upper portion, of a spout having parallel sides made independently of and applied to the said cylindrical upper portion of the body and containing two parallel guideways, and a removable strainer located outside of the said body and within the said spout and consisting of a sheet-metal frame and a piece of wire-cloth, the said frame having parallel side edges respectively entered into the said parallel guideways of the spout and its upper end being extended out of the spout for use as a handle.

2. In a coffee-pot, the combination with the body thereof, of a spout, a removable strainer having parallel side edges for insertion into the said spout, means for engaging with the parallel edges of the strainer for guiding it and holding it in place, and a strainer-stripper for stripping the inner face of the strainer when the same is lifted from its closed position.

3. In a coffee-pot, the combination with a body having a discharge-opening, of a strainer-stripper located directly above the said opening, a spout having parallel sides containing two parallel guideways, and a removable strainer located outside of the said body and within the said spout and having parallel side edges respectively entered into the said parallel guideways of the spout, and stripped by the said strainer-stripper when it is lifted from its closed position.

In testimony whereof we have signed this specification in the presence of two subscribing witnesses.

EDWARD B. HARDIE.
DANIEL F. DALTON.

Witnesses:
J. H. BAILEY,
CHAS. R. TAYLOR.